United States Patent [19]

Aurandt

[11] Patent Number: 4,950,865

[45] Date of Patent: Aug. 21, 1990

[54] METHOD AND APPARATUS FOR FORMING THERMOCOUPLE JUNCTIONS

[75] Inventor: Richard G. Aurandt, Los Angeles, Calif.

[73] Assignee: The Aerospace Corporation, El Segundo, Calif.

[21] Appl. No.: 452,921

[22] Filed: Dec. 18, 1989

[51] Int. Cl.⁵ ............................................ B23K 28/00
[52] U.S. Cl. ........................... 219/137 PS; 219/56.22; 219/121.11
[58] Field of Search ............ 219/137 PS, 137 R, 56.1, 219/56.22, 9.5, 130.4, 121.11

[56] References Cited

U.S. PATENT DOCUMENTS

| | | | |
|---|---|---|---|
| 1,605,860 | 11/1926 | Snelling | 219/121.11 |
| 2,843,726 | 7/1958 | Kiernan | 219/56.22 |
| 2,990,467 | 6/1961 | Rindy | 219/137 R |
| 3,546,424 | 12/1970 | Howie, Jr. | 219/130.4 |
| 3,617,684 | 11/1971 | DiMino | 219/121.11 |

Primary Examiner—Clifford C. Shaw
Attorney, Agent, or Firm—William J. Burke

[57] ABSTRACT

A high quality, small-scale thermocouple is formed by the corona developed at the twisted ends of two wires connected to a high voltage, radio frequency source.

3 Claims, 1 Drawing Sheet

METHOD AND APPARATUS FOR FORMING THERMOCOUPLE JUNCTIONS

STATEMENT OF GOVERNMENT INTEREST

The invention described herein may be manufactured and used by or for the Government of the United States for governmental purposes without the payment of royalty therefor.

BACKGROUND OF THE INVENTION

1. Field of the Invention

This invention relates to the manufacture of thermocouples, in particular, high quality, small-scale thermocouples.

2. Description of the Prior Art

The prior art discloses several techniques for forming thermocouples. For example, thermocouples have been formed using welding techniques including spot, carbon arc or heliarc welding or other techniques involving heating and mechanical bonding.

There are at several limitations with these techniques. One problem is that wire breakages are common. A recent mechanical solution to this problem is discussed in an article entitled, "Method and Apparatus for Making Fine Wire Thermocouples", J. Phys. E. Sci. Instrum. 21, 52-54 (1988).

A second problem is the presence of impurities by which are created in the thermocouple by the particular process. These impurities detract from the performance and quality of the thermocouple.

A third problem is the difficulty and expense associated with mechanical bonding techniques.

At least one technique has been proposed to reduce the presence of impurities in a thermocouple. That technique uses electron beam welding. However, a high vacuum is required and the process is quite expensive. In addition, the electron beams may cause the thermocouple leads to outgas. Impurities produced during outgassing can then find their way into the thermocouple.

It is an object of this invention to produce a high quality, small-scale thermocouple that is relatively free of impurities.

A further object of this invention is to produce high quality, small-scale thermocouples using a relatively low cost process and materials.

SUMMARY OF THE INVENTION

A thermocouple is formed by applying a controlled, grounded, high frequency, high voltage source to one end of two leads which are located in a argon or helium gas atmosphere. The source causes a corona to form at the opposite end of the leads, creating a high quality thermocouple in an easily controlled process.

DETAILED DESCRIPTION OF THE PREFERRED EMBODIMENT

Figure 1:
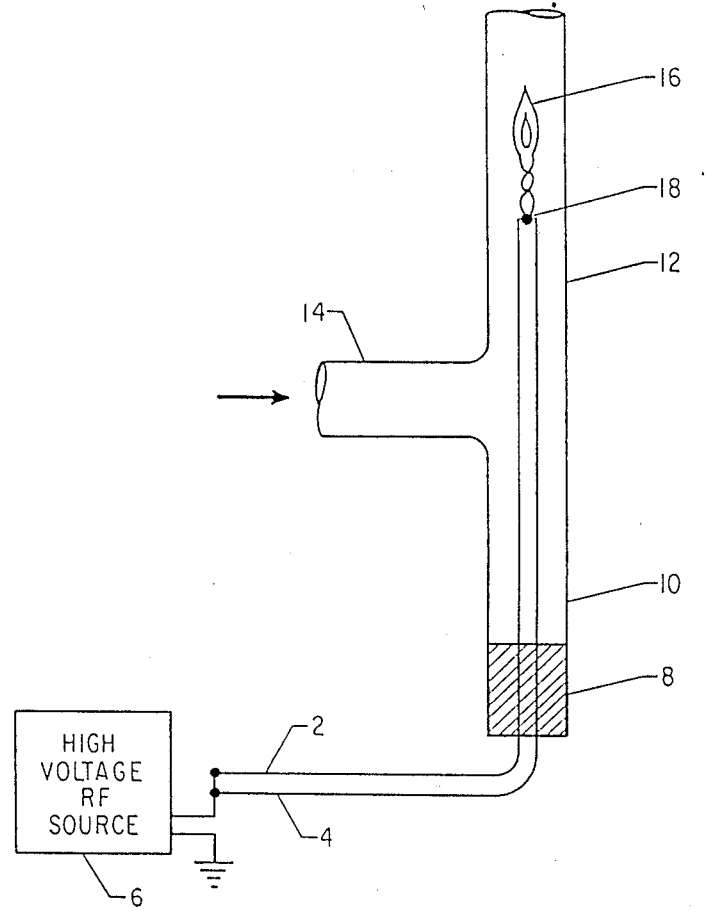
FIG. 1 is a schematic of the apparatus of the present invention.

Referring to FIG. 1, two leads of wires 2 and 4 are attached at one end to a high voltage radio frequency transformer 6. The bare leads run through a stopper 8 at one end of a glass "T" tube 10 to the opposite end of the "T" 12, where they are twisted together. Argon or helium gas is flowed through the third end of the "T" 14. When the transformer 6 applies a voltage to the wire 2 and 4, a corona 16 forms and propagates in the direction of the flow of the gas. The corona 16 also creates a junction 18 between the twisted leads. The size of the junction 18 is determined by the number of twists.

If the leads are insulated, they are wrapped to form a non-inductive coil. This prevents any electrical potential being developed along the length of the leads that might damage the insulation. Also, where long insulated leads (12" or more) are employed, the source is applied immediately below the junction through a metal clip. This clip serves both as an electrical connection and as a heat sink. Thus, it protects the lead insulation while it prevents the contamination of the junction by outgasing.

In one embodiment of the invention, the power level of the source was set to about 675 volt-amps, the oscillator frequency set to 6–8 Mhz and the junction was heated to about 1575 degrees Centigrade. The latter settings were chosen to provide a corona of sufficient size and temperature to fuse the junction in question. Under these conditions, it took about 5 seconds to form a thermocouple from chromel alumel wire 0.05 mm in diameter. The technique of the present invention has been successfully employed for thermocouple junctions as large as 1.5 mm in diameter.

The thermocouples formed using the technique described were then compared with commercial "Omega" junctions of the same type. The thermocouple junctions were immersed in a common heat source at various levels. The outputs were then observed on an "ANALOGIC Digi-Cal II" thermocouple digital readout. No significant discrepancies between the two sets of outputs were noted.

It will be obvious to one skilled in the application of high-frequency, high-voltage current that various modifications can be made to this invention without departing from the scope of the invention as defined in the following claims.

I claim:

1. A method of making a thermocouple assembly from two metal wires comprising the steps of
    (a) flowing a stable gas through a container;
    (b) placing one end of each wire in proximity to one another in the container;
    (c) attaching the remaining end of each wire to a high voltage, high frequency transformer;
    (d) applying a voltage to the wires such that a corona forms at the unattached ends of the wire, thereby producing a high quality thermocouple.

2. A method as claimed in claim 1 wherein the voltage is set to about 675 volt amps and the oscillator is set to about 6 to 8 Mhz.

3. A method as claimed in claim 1 wherein the junction is heated to about 1575 degrees Centigrade.

* * * * *